United States Patent
Manka

[15] 3,673,854
[45] July 4, 1972

[54] METHOD OF OPERATING GAS ANALYSIS APPARATUS

[72] Inventor: Dan Paul Manka, Pittsburgh, Pa.
[73] Assignee: Jones & Laughlin Steel Corporation, Pittsburgh, Pa.
[22] Filed: July 22, 1970
[21] Appl. No.: 57,342

[52] U.S. Cl. ..................73/23, 23/232 E, 23/254 E, 23/255 E
[51] Int. Cl. ...................................G01n 31/00
[58] Field of Search.............73/23, 23.1, 27, 19, 25, 26, 73/1; 23/254 E, 255 E, 232, 232 E; 75/60, 41

[56] References Cited

UNITED STATES PATENTS

| | | | |
|---|---|---|---|
| 3,531,256 | 9/1970 | Kaczaj | 23/232 |
| 3,495,437 | 2/1970 | Ester | 73/1 R |
| 3,520,657 | 7/1970 | Trumerman | 73/23 |

*Primary Examiner*—Richard C. Queisser
*Assistant Examiner*—C. E. Snee, III
*Attorney*—G. R. Harris and T. A. Zalenski

[57] ABSTRACT

The time required for continuous gas analyzers of blast furnace top gas and the like to reach steady-state conditions after an interruption of furnace operation is greatly reduced by a process including drying the stream of gas analyzed and sealing a gas containing the analyzed constituents within the gas analysis apparatus during the period of interruption.

8 Claims, No Drawings

METHOD OF OPERATING GAS ANALYSIS APPARATUS

It is common in chemical processes to analyze continuously the off gases from a chemical reaction in order to determine its progress. An example of such process is that of smelting iron in a blast furnace, which operation ordinarily is carried on continuously 24 hours a day, 7 days a week. The furnace is charged continuously and blast is blown through the tuyeres continuously, though at reduced pressure when the furnace is being tapped, and iron and slag are tapped out at intervals of a few hours. The progress of reactions in the furnace can be gauged by the relative amounts of carbon monoxide and carbon dioxide in the top gas, and those compounds, together with the hydrogen content of the top gas, are conventionally determined by apparatus which continuously samples the top gas and continuously analyzes those constituents. My invention to be described is particularly will adapted to the continuous analysis of blast furnace top gas and will be described hereinafter in that context, but it is likewise adapted to the continuous analysis of other constituents in off gases from other chemical reactions.

The methods of continuously analyzing the constituents of blast furnace top gas above mentioned and the apparatus used therefor are well known, and in themselves form no part of my invention. It is conventional to separate the gross solids from the top gases in an apparatus known as a dust catcher. The gas sample to be analyzed is taken from a point downstream from this apparatus and the gas is filtered through successive filters designed to remove solid particles larger than about 0.07 microns in size. The gas so filtered is then passed through measuring units adapted to measure continuously and to record the contents of the constituents of interest. As had been mentioned, those of greatest interest are CO, $CO_2$ and $H_2$. Occasionally, methane, $CH_4$, is also measured. The CO, $CO_2$ and $CH_4$ are usually measured by passing the gas through separated infrared analyzing cells. There infrared radiation is transmitted through the gas stream to a detector. Each of the constituents of the top gas above mentioned preferentially absorbs infrared radiation at specific wave lengths in proportion to its concentration in the gas stream. In one type of analyzer, the separate radiation detectors are thermopiles which convert the radiation to which each is sensitive into an electrical signal.

Hydrogen does not absorb infrared radiation and is generally measured by a thermal conductivity apparatus. The analyzer uses a Wheatstone bridge circuit with a measuring and reference arm. In each of those arms is a cell with a filament. The filament is heated to a high temperature by the current passed through it. Gas to be analyzed flows through the measuring cell, and the reference cell is filled with a reference gas. The heat loss from the filament in the measuring cell depends on the thermal conductivity of the gas constituent flowing through it. This heat loss and change in electrical resistance of the filament caused thereby is proportional to the $H_2$ content of the gas. The bridge apparatus continuously compares the electrical resistance of the filaments in the measuring and the reference cells and its output is an electrical signal proportional to the concentration of $H_2$ in the gas stream.

The sample gas is conducted into the gas analysis apparatus briefly described above and conventionally is exhausted therefrom into the atmosphere. For calibration purposes, gases of known concentrations of the constituents measured are provided, usually in pressure cylinders, and at intervals are connected to the gas analysis apparatus in place of the sample gas. The gas analysis apparatus when connected either to the sample gas or calibrating gas is sealed off from the atmosphere, except at its exhaust end. In operation, the pressure of the sample or calibrating gas leaving the apparatus is above atmospheric pressure. The resistance to flow of the filters and other apparatus in the stream of sample gas is overcome by suitable motor driven pumps.

Normally, a blast furnace operates under continuous blast, as has been mentioned, and so continuously evolves top gas. However, it is sometimes necessary to interrupt operations so that the evolution of top gas ceases. When this happens, the gas analysis apparatus is cut off from the sample stream, usually by shutting a valve in the sample pipeline. The pumps connected therewith are turned off. Conventionally, this allows atmospheric air to enter the analyzer through the exhaust pipe.

When the furnace operation recommences, it is conventional to check the calibration of the gas analysis apparatus before reconnecting it to the sampling stream. This is done by passing a calibrating gas through the apparatus. Normally, the gas analysis apparatus will give correct readings in a period of time of about 2 minutes and it is then connected to the sampling stream. When the gas analysis apparatus is checked against the calibrating gas in regular operation, it normally gives correct readings in about the same 2 minute period of time.

It sometimes happens, however, that after an interruption of furnace operation, the gas analysis apparatus requires a period of time as long as an hour to come up to equilibrium. The gas analysis apparatus will initially give CO and $CO_2$ content readings lower than the known contents of those compounds in the calibrating gas. The $H_2$ reading, on the other hand, will be above the $H_2$ content of the calibrating gas and will slowly reduce to the correct value. During such periods of time, the gas analysis apparatus cannot be used and the operator has no check on the operation of the furnace. This condition seems to be associated with furnaces nearing the ends of their campaign.

It is an object of my invention to provide a process of analyzing off gas from a chemical operation which obviates the delays mentioned in the preceding paragraph. Several embodiments of my invention presently preferred by me will appear in the description of my invention which follows:

Those skilled in the art of continuous gas analysis have observed that in spite of the filters employed to remove all solid particles from the gas stream being analyzed, a thin layer of fine dust builds up inside the gas analysis apparatus. Deposits of this sort are not unknown in apparatus used in mill environments and as a practical matter, seem to be impossible to prevent. I have discovered that this dust sometimes includes a compound which acts like silica gel and appears to be a form of activated silica. This compound adsorbs CO and $CO_2$ from a gas stream containing those constituents until it is saturated. If it is then exposed to a gas stream or an atmosphere which does not contain those constituents, or which contains moisture, these are desorbed. During normal analysis of dry sample gas in gas analysis apparatus in which this dust is deposited the adsorbent compound remains saturated with CO and $CO_2$ and the analyzer indicates correctly any change of the concentration of those constituents in the gas stream. If the gas analysis apparatus is then switched to a calibrating gas it reads correctly in a period of time of 2 minutes or so. If, however, atmospheric air or other gas not containing CO and $CO_2$ gets into the gas analysis apparatus, the activated silica desorbs its CO and $CO_2$ to that gas. When a gas containing those constituents, such as a calibrating gas, is reintroduced into the gas analysis apparatus, the activated silica particles adsorb those constituents from the gas stream until they are again saturated.

I have also discovered that the activated silica in the dust adsorbs moisture, in preference to CO and $CO_2$, from a moisture-containing gas passed over it and desorbs that moisture to a dry gas. Blast furnace gas normally contains some moisture and so saturates the activated silica particles with moisture during normal continuous gas analysis. If, when blast furnace operation is interrupted, the gas analysis apparatus is allowed to fill with atmospheric air, the activated silica particles do not desorb that moisture because atmospheric air normally contains moisture. Then, if a dry calibrating gas is introduced into the gas analysis apparatus when the blast furnace resumes operation, the moisture on the activated silica particles is desorbed into the gas stream. The dry solids then adsorb CO and $CO_2$ from the calibrating gas and the $H_2$ content, as read by the gas analyzer, shows a higher value than the actual concentration of that element in the calibrating gas until the particles are saturated with $CO$ and $CO_2$.

In one embodiment of my invention, I clean out all deposited dust from the gas analysis apparatus before it is put back into use after an interruption of operation of the blast furnace. While this embodiment of my process is effective, it is tedious to carry out because it requires dismantling and reassembly of the gas analysis apparatus. All dust must be removed from all the pipes, valves, pumps, filters, absorption cells, conductivity cells and other apparatus components, by hand.

In another embodiment of my invention, I maintain $CO$ and $CO_2$ equilibrium by sealing off the gas analysis apparatus, both at entry and discharge ends, from all wet gases and from those not containing $CO$ and $CO_2$ during periods of interruption of blast furnace operation. This is accomplished either by passing a substitute gas containing $CO$ and $CO_2$ through the gas analysis apparatus during the entire time it is disconnected from the blast furnace gas sampling stream or by closing off the gas analysis apparatus from the outside atmosphere at both entry and discharge ends so that the $CO$ and $CO_2$ containing gas in the gas analysis apparatus at the time of interruption is trapped in that apparatus.

In either case mentioned above, the adsorbent silica particles are maintained in a $CO$ and $CO_2$ saturated condition until regular operations resume. The substitute gas can be the calibrating gas or any gas containing $CO$ and $CO_2$. The apparatus is closed off by providing it with a valve at its discharge end as well as at its entry end and closing the discharge valve before closing the entry valve.

To further maintain equilibrium, I dry the sample gas, first by conventional means to a dew point of about 40° F. (0.8 percent moisture), then to less than 500 parts per million of moisture with a desiccant, such as calcium sulfate. The calibrating gas is dry; therefore, the sample gas must also be dry. If moisture is present in the gas, the silica gel adsorbs moisture preferentially and desorbs the $CO$ and $CO_2$. A dry gas then desorbs the moisture but the dry solids again adsorb $CO$ and $CO_2$ until equilibrium is reached. By "dry" gas I mean a gas with a moisture content of about 500 parts per million or less.

As I have mentioned, the calibration difficulties usually appear when a blast furnace is nearing the end of a campaign. A furnace campaign ends when the furnace lining is badly worn. It is quite likely that the activated silica particles carried over by the blast furnace gas come from the disintegrating furnace lining.

I claim:

1. The method of continuously analyzing off gas from a chemical reaction carried on continuously subject to interruptions, comprising passing it through continuous gas analysis apparatus containing unwanted material which adsorbs a constituent to be analyzed from the off gas and desorbs it to gases not containing that constituent, preventing entrance into the apparatus of gases not containing that constituent, sealing off the gas analysis apparatus from gases not containing that constituent during periods of interruption of the chemical reaction, and again passing the off gas through the gas analysis apparatus when the interruption ceases.

2. The method of claim 1 in which the gas analysis apparatus is sealed off by passing therethrough a substitute gas containing that constituent.

3. The method of claim 1 in which the gas analysis apparatus is sealed off from all external gases so as to maintain within it the identical gas which was present there prior to interruption.

4. The method of claim 1 in which the off gas is blast furnace top gas, and the gas analysis apparatus is adapted and adjusted to analyze the off gas for at least one of its constituents carbon monoxide and carbon dioxide.

5. The method of claim 1 in which the off gas is blast furnace top gas, the gas analysis apparatus is adapted and adjusted to analyze the off gas for at least one of its constituents carbon monoxide and carbon dioxide, and for hydrogen, and including the step of drying the off gas before introducing it into the gas analysis apparatus.

6. The method of claim 5 in which the off gas is dried to a moisture content of not more than about 500 parts per million.

7. The method of claim 1 in which the unwanted material is fine solid particles carried by the off gas and lodged in the gas analysis apparatus.

8. The method of claim 7 in which the fine solid particles comprise surface active silica.

* * * * *